United States Patent [19]
Kainec et al.

[11] Patent Number: 5,637,968
[45] Date of Patent: Jun. 10, 1997

[54] POWER TOOL WITH AUTOMATIC DOWNSHIFT FEATURE

[75] Inventors: Stephen M. Kainec, South Euclid; William L. Naumann, Chesterland, both of Ohio

[73] Assignee: The Stanley Works, Conn.

[21] Appl. No.: 141,783

[22] Filed: Oct. 25, 1993

[51] Int. Cl.$^6$ ................................................. B25B 23/147
[52] U.S. Cl. ................ 318/432; 29/407.01; 29/707; 173/5; 81/469
[58] Field of Search ................................. 318/432, 433, 318/434; 388/937; 173/4–7, 217, 93.5; 81/467, 469; 73/862.23, 862.24; 29/407, 707

[56] References Cited

U.S. PATENT DOCUMENTS

| | | | |
|---|---|---|---|
| 4,106,176 | 8/1978 | Rice et al. | 29/407 |
| 4,228,576 | 10/1980 | Eshghy | 29/407 |
| 4,305,471 | 12/1981 | Eshghy | 173/12 |
| 4,344,216 | 8/1982 | Finkelston | 29/407 |
| 4,375,123 | 3/1983 | Ney | 29/407 |
| 4,959,797 | 9/1990 | McIntosh | 364/508 |
| 5,131,130 | 7/1992 | Eshghy | 29/407 |
| 5,154,242 | 10/1992 | Soshin et al. | 173/178 |
| 5,205,031 | 4/1993 | Hansson | 29/707 |
| 5,215,270 | 6/1993 | Udocon et al. | 29/407 |
| 5,315,501 | 5/1994 | Whitehouse | 364/152 |

Primary Examiner—Brian Sircus
Attorney, Agent, or Firm—Haves & Reinsmith

[57] ABSTRACT

A method and apparatus for correcting torque overshoot in power tools wherein torque per angle rate is sensed on each rundown and the speed of the tool is automatically adjusted to maintain torque accuracy on higher torque rate joints while maintaining speed on lower torque rate joints, automatically minimizing tool heating and maximizing job rate. In the setting of threaded fasteners, joint rates are defined as high (hard), medium or low (soft). Two torque points are defined, a first torque point and a second torque point, which are percentages of the target torque, for example 25% and 50% respectively. Two angle values are defined corresponding to the number of degrees of tool spindle rotation measured along the portion of the torque/angle curve between the first torque point and the second torque point on typical linear hard and medium joints. Two final tightening speeds are defined as percentages of full speed corresponding to the tool system requirements for accurate shutoff on the two types of joints, hard and medium. A controller counts the number of angle degrees between the first torque point and the second torque point. The angle counted is compared with the values of hard and medium angles to determine the joint rate. If the angle is less than or equal to the hard angle, the joint is considered hard and the controller immediately downshifts the tool to the hard speed. If the angle is greater than the hard angle but less than or equal to the medium angle, the joint is considered medium and the controller immediately downshifts the tool to the medium speed. If the angle is greater than the medium angle, the joint is considered soft and the speed is not changed.

9 Claims, 5 Drawing Sheets

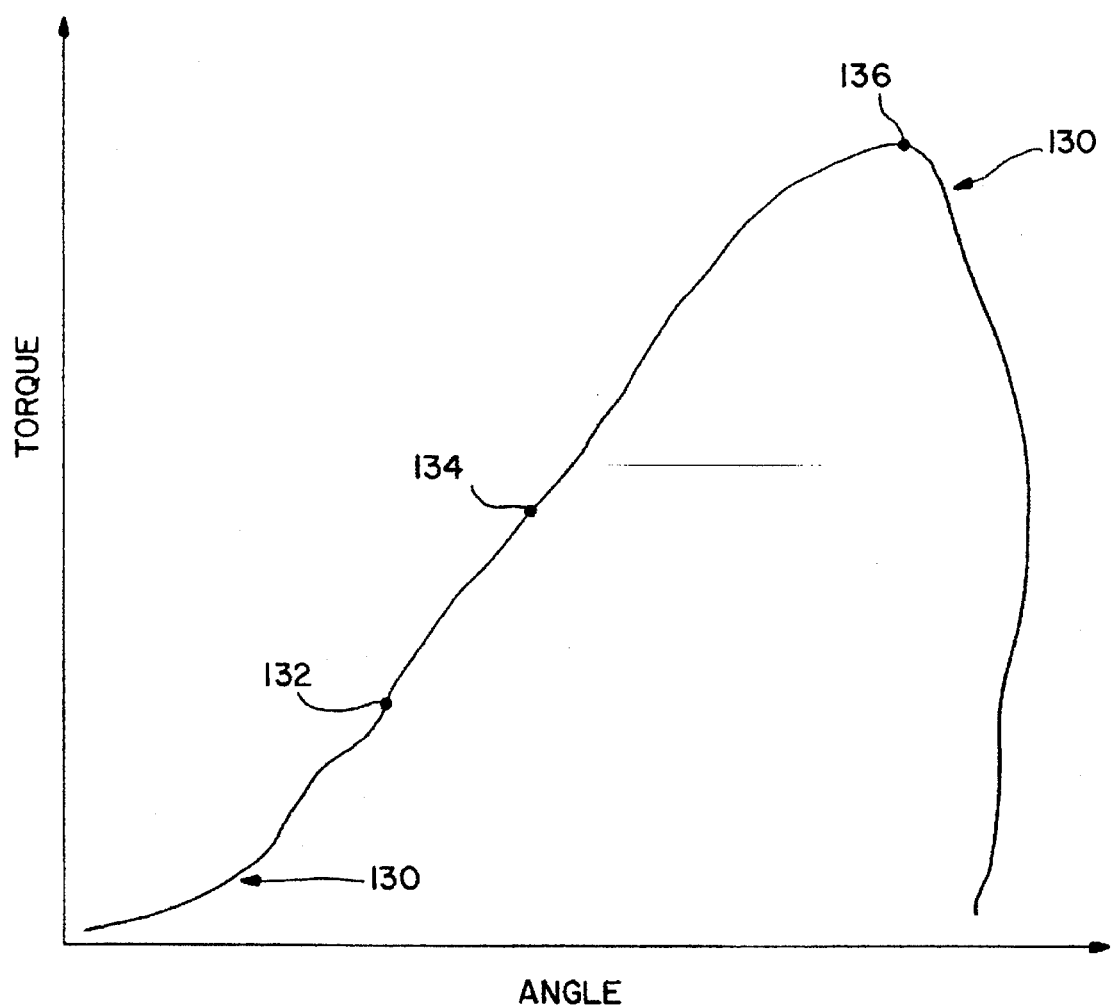

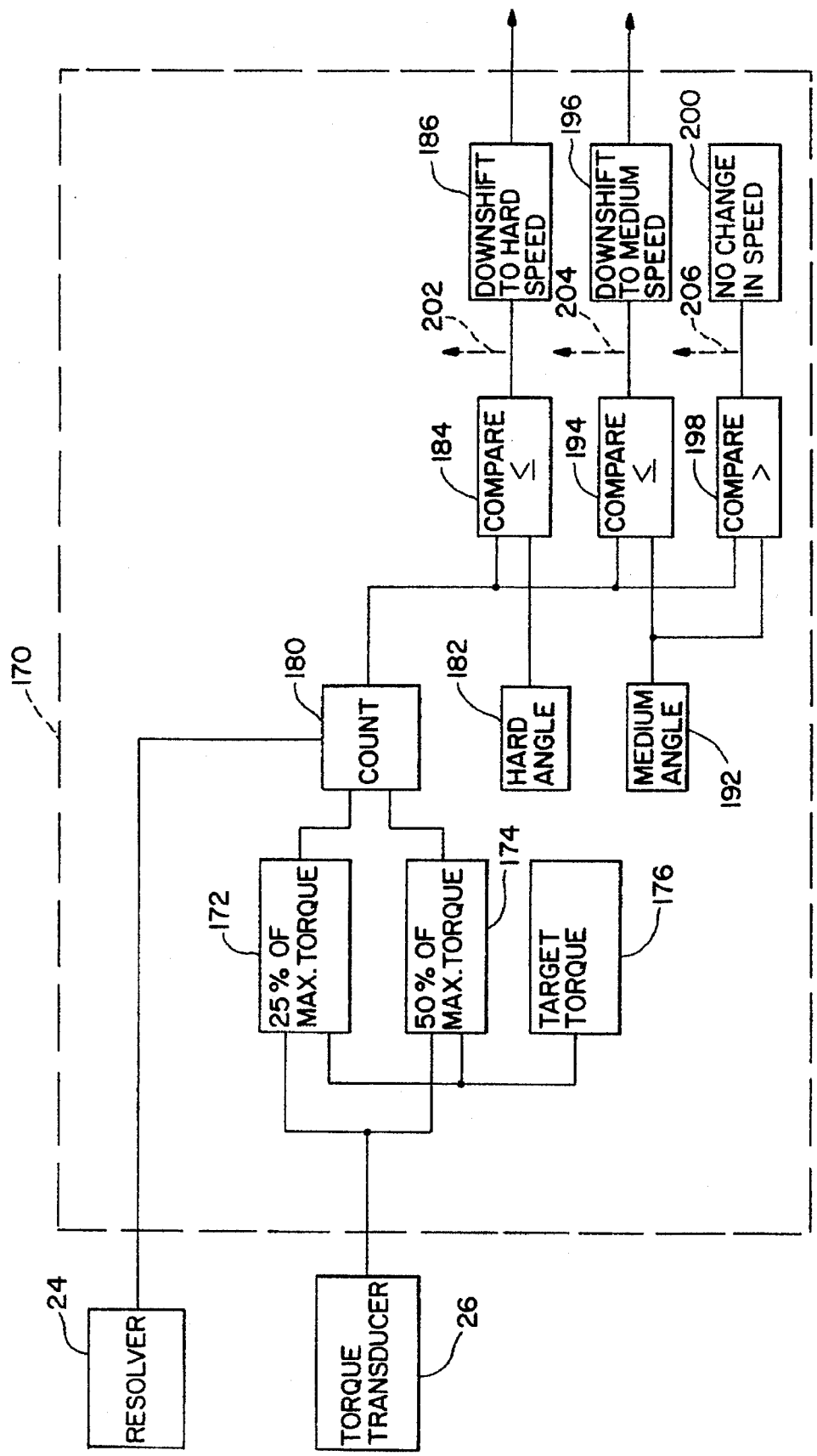

POWER TOOL WITH AUTOMATIC DOWNSHIFT FEATURE

BACKGROUND OF THE INVENTION

This invention relates to power tools and, more particularly, to a new and improved control system and method to correct for torque overshoot in such tools.

One area of use of the present invention is in tightening threaded fasteners, although the principles of the present invention can be variously applied. In controlled power tool systems used in tightening threaded fasteners the amount of torque required to turn the fastener one degree is known as the torque rate. In a typical electrically operated system, the fastening tool contains a motor connected through a set of speed reducing, torque amplifying gears, to any of a number of output heads connecting the tool to the socket being used to tighten the threaded fastener. At some point in the gear train a torque transducer is located which generates electrical signals proportional to the torque being transmitted through that point in the gearing. The on/off run status of the tool motor is controlled by a microprocessor-based meter/control unit.

In such a power tool, an electrical signal proportional to torque is fed from the torque transducer in the tool to the control unit in which a torque target has been set. When that target torque is reached, the run status command signal being sent from the control unit to the tool is turned off. The tool stops, but not quickly enough to prevent some torque overshoot above the target torque set on the controller. The time required to sense the torque, process the information and remove the run signal, along with the inertia in the decelerating high-speed elements in the tool, cause the rotating components to continue to rotate beyond the point at which they were to have stopped. This excess rotation, when transmitted through the tool to the fastener, can potentially drive the final fastener torque well beyond the target torque set in the control unit.

On a high torque rate threaded joint, the torque can be driven beyond the upper limit of acceptability for the joint, causing the joint to be considered unacceptable. The capability of the tool to control torque on a combined series of threaded fasteners of widely differing torque rates is a measure of tool accuracy, with minimum acceptable specifications for particular users. A competitive advantage exists for manufacturers of tools with the ability to control torque on such a combined series of joint types. A further competitive advantage exists for manufacturers whose fastening systems accomplish this control with a minimum of user involvement and complexity.

One way to correct the torque overshoot problem is to partially slow the tool at some point in the tightening sequence earlier than that point at which the measured torque is equal to the target torque. This is generally done by employing a downshift feature where at a pre-defined pre-torque torque value, the speed is lowered to a specified downshift speed value. The lower speed proportionally reduces only the portion of the torque overshoot produced by the excess rotation of the tool motor due to the inertia in the decelerating high-speed elements in the tool.

One shortcoming of the foregoing approach arises from the fact that it is convenient for a customer to use fastening systems operated with a common control unit. The downshift feature described hereinabove would therefore be active for every tightening sequence, not just the ones that would benefit from it. The lower speed is maintained even on joints that require many revolutions to reach the target torque, which causes delays in production and excessive electrical tool heating, with no significant improvement in final torque accuracy. Furthermore, it is inconvenient and sometimes impossible for a customer to setup these control units differently for each tool and fastener combination.

Another consideration arising from the foregoing downshift approach is that the magnitude of the total gear ratio in the tool has a significant effect on the torque overshoot, given a common motor and control unit combination. Lower total gear ratios transmit more of the excess motor rotation to the fastener, while higher ratios transmit less, making lower ratio tools particularly vulnerable to torque overshoot. The setting of the downshift parameter values must therefore be a compromise if low and high ratio tools are to be operated with a common motor and control unit combination. If the speed is set to favor the low ratio tools, high ratio tools using this setup will run slower than necessary causing aforementioned delays in production and excessive electric tool heating, particularly on low torque rate joints.

SUMMARY OF THE INVENTION

It is, therefore, a primary object of the present invention to provide a new and improved system and method to correct for torque overshoot in power tools.

It is a further object of this invention to provide such a method and apparatus which operates efficiently and effectively on high, medium and low torque rate fastening jobs.

It is a more particular object of this invention to provide such a method and apparatus which allows the tool to run at maximum speed as long as possible before slowing down near the target torque.

It is further object of this invention to provide such a method and apparatus which accomplishes the foregoing with a minimum of user involvement and complexity.

The present invention provides a method and apparatus for correcting torque overshoot in power tools wherein torque per angle rate is sensed on each rundown and the speed of the tool is automatically adjusted to maintain torque accuracy on higher torque rate joints while maintaining speed on lower torque rate joints, automatically minimizing tool heating and maximizing job rate. In particular, in the setting of threaded fasteners, joint rates are defined as high (hard), medium or low (soft). Two torque points are defined, a first torque point and a second torque point, which are percentages of the target torque, for example 25% and 50% respectively. Two angle values are defined corresponding to the number of degrees of tool spindle rotation measured along the portion of the torque/angle curve between the first torque point and the second torque point on typical linear hard and medium joints. Two final tightening speeds are defined as percentages of full speed corresponding to the tool system requirements for accurate shutoff on the two types of joints, hard and medium. A controller counts the number of angle degrees between the first torque point and the second torque point. The angle counted is compared with the values of hard and medium angles to determine the joint rate. If the angle is less than or equal to the hard angle, the joint is considered hard and the controller immediately downshifts the tool to the hard speed. If the angle is greater than the hard angle but less than or equal to the medium angle, the joint is considered medium and the controller immediately downshifts the tool to the medium speed. If the angle is greater than the medium angle, the joint is considered soft and the speed is not changed.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 3 is a graph including a torque-angle plot illustrating an aspect of the present invention;

FIG. 5 is a structure chart of a program for carrying out the present invention.

DETAILED DESCRIPTION OF THE ILLUSTRATED EMBODIMENT

Figure 1:
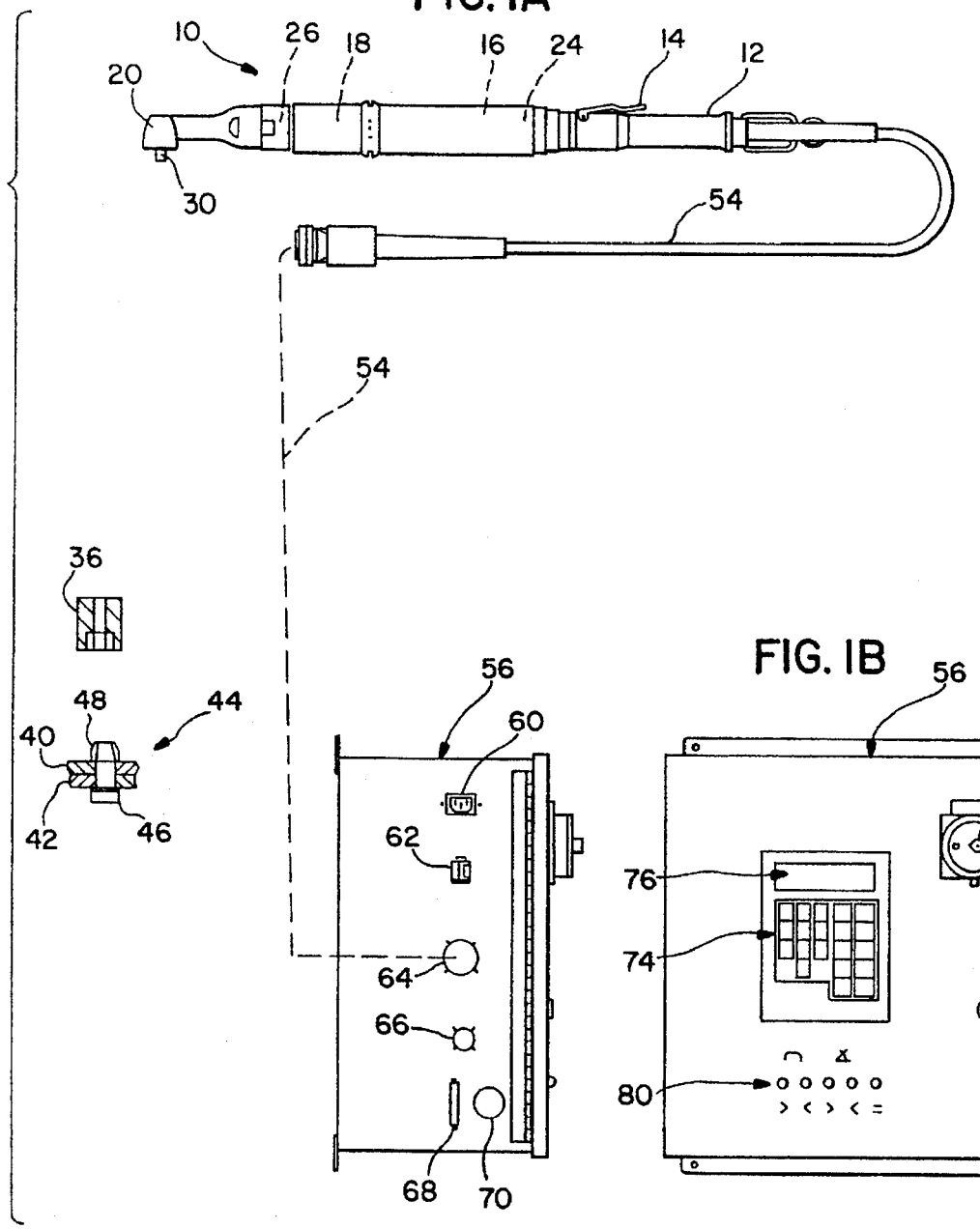
FIGS. 1A and 1B are schematic diagrams of an electric power tool according to the present invention.

FIGS. 1A and 1B illustrate an electric power tool in the form of a portable d.c. electric nutsetter and associated controller incorporating the control system and method to correct for torque overshoot according to the present invention. The power tool 10 shown is a rotary power tool for use in setting screws, nuts and other threaded fasteners. Typically, an electric fastening tool comprises a hand grip 12, control switch operator 14, high speed electric motor 16, gear reduction 18 to reduce speed and increase torque and an output drive 20 to connect to a fastener. There is also provided a resolver 24 for motor commutation and for providing angle information and a transducer 26 for providing torque information, all in a manner which will be described. The output drive 20 is provided with a key 30 for connection to a socket 36 for application to a fastener for tightening the same. FIG. 1A also illustrates a typical fastening job wherein sheets 40, 42 of a workpiece are joined by fastener 44 comprising threaded bolt 46 and nut 48.

A cable 54 connects tool 10 to a control housing 56 containing a power supply, servo amplifier and microprocessor-based controller (not shown in FIG. 1), all of which will be described in further detail presently. Cable 54 includes a plurality of conductors (not shown in FIG. 1) for supplying electrical power to motor 16 for operating the same, and for connecting resolver 24 and transducer 26 to the above-mentioned controller for a purpose to be described. As shown in FIG. 1A, housing 56 is provided on one side with a connector 60 for providing electrical connection to the a-c line, a ground fault interrupter 62, a connector 64 to receive the end of cable 54, an I/O connector 66, and communication ports 68 and 70 whereby the system can be operatively connected to a printer or bar code reader and to a host computer, respectively. As shown in FIG. 1B, housing 56 is provided on the front side with a keypad 74 for inputing commands and information to the afore-mentioned controller and a display 76. The front side of housing 56 also includes a main on-off switch 78 and indicator lamps generally designated 80 for signalling various modes of operation.

Figure 2:
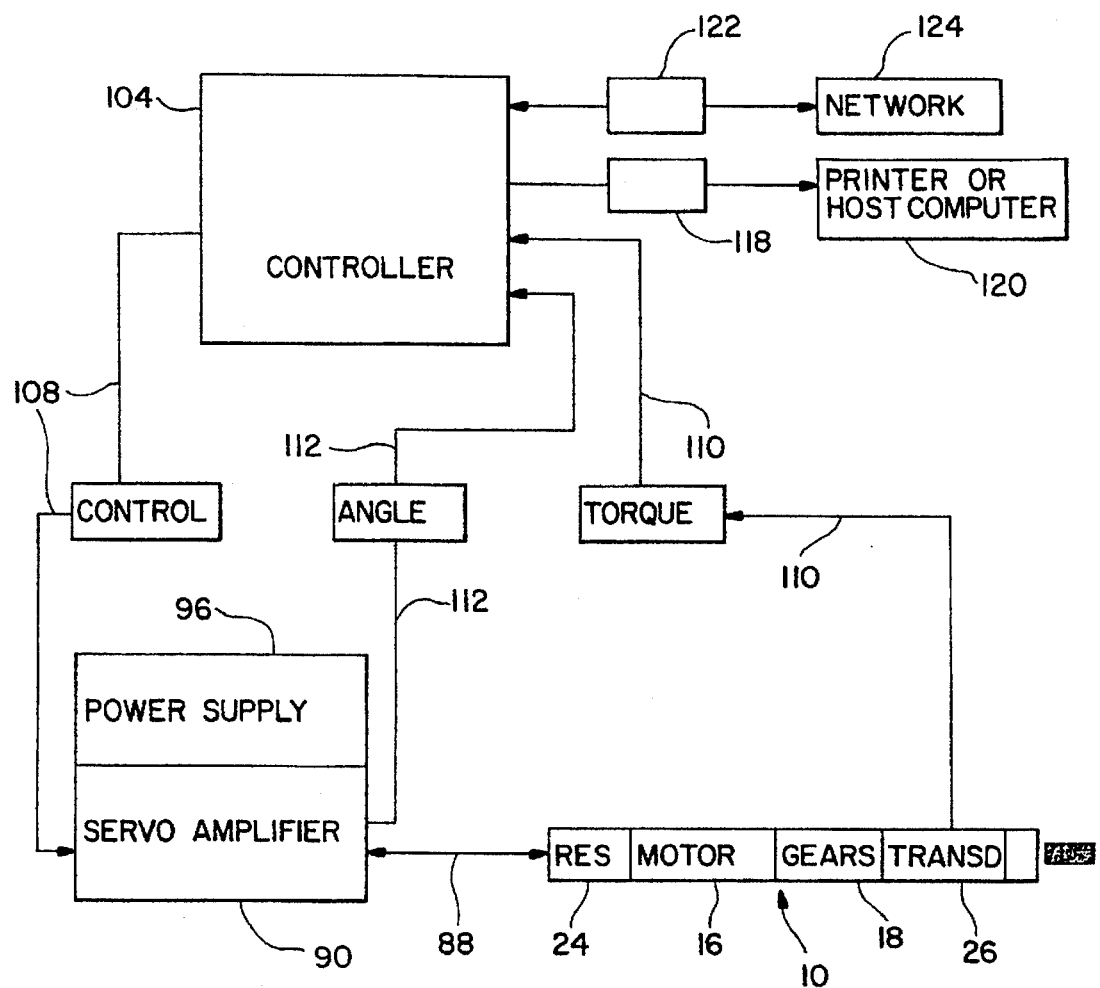
FIG. 2 is a block diagram further illustrating the electric power tool of FIG. 1.

The system of FIG. 1 is illustrated further by the schematic block diagram of FIG. 2. As described in connection with FIG. 1, tool 10 includes a motor 16, speed reducing gears 18 coupling the motor output shaft to an output drive 20, a torque transducer 26 operatively connected between the gears 18 and output drive 20 and a resolver 24 operatively associated with motor 16. Motor 16 is a brushless, electronically commutated, resolver-based DC servo motor which runs on pulse width modulated (PWM) direct current and has a stator provided with a three phase stationary winding and a plurality of rare earth magnets bonded to the rotor, for example eight neodymium magnets providing an 8-pole motor. Resolver 24 is a variable reluctance brushless resolver which provides positional information for motor commutation and angle. Resolver 24 is a rotating transformer which generates signals which are utilized to commutate the motor windings and make the motor 16 run. These resolver signals also are converted into angle information, eliminating the need for a separate encoder on tool 10.

The signal output of resolver 24 is applied via line 88 to an input of a servo amplifier designated 90 in FIG. 2. The signals from resolver 24 are used by servo amplifier 90 to commutate motor 16, and the resolver signals are converted by servo amplifier 90 into angle information relating to the rotation of tool 10. In particular, servo amplifier 90 includes an isolation transformer, full wave bridge rectifier, filter and amplifier circuit. Servo amplifier 90 decodes the resolver signals generated by the dc servo motor 16 in tool 10 and uses this feedback information to rim the motor in a closed velocity loop. The amplifier 90 switches the voltage in the three phase windings of motor 16 to maintain the rotational speed and direction commanded by the fastening system controller. A filtered power supply 96 operatively associated with servo amplifier 90 converts 115 or 230 VAC single-phase line voltage to a DC bus voltage which it supplies to amplifier 90. The servo amplifier, in turn, provides this DC bus voltage to the tool spindle motor 16 while monitoring the rotor position via resolver 24 as described.

A microprocessor-based controller 104 is provided which utilizes the built-in torque transducer 26 of tool 10 to control peak dynamic torque, i.e. the peak torque measured while the tool 10 is setting a threaded fastener, and to stop tool 10 when it achieves a torque preset on the controller. Resolver 24 in tool 10 also serves as an angle encoder, allowing the tool to be used with controller 104 to measure the number of degrees of rotation of the tool spindle above a torque threshold. This measured angle can be used for monitoring or for tool shutoff from a preset angle. Thus, controller 104 is connected in controlling relation to servo amplifier 90 via path 108 for controlling the speed of tool 10. Signals containing torque and angle information from transducer 26 and resolver 24, respectively, are sent to controller 104 via paths 110 and 112, respectively. Controller 104 also has two communication ports, one designated 118 for use with a printer, bar code reader or host computer 120 and the other designated 122 for connection to a network 124 for uploading and downloading to a personal computer.

In the operation of the arrangement of FIGS. 1 and 2, in response to manual actuation of switch operator 14, rotational output from tool 10 is transmitted through output drive 20 and socket 36 to fastener 44 for tightening the same in a known manner. During the fastening job, an analog signal from torque transducer 26 is applied to controller 104 in which a torque target value has been set previously by the operator using keypad 74. When that target is reached, a control signal is sent from controller 104 to servo amplifier 90 to stop motor 16 and shut the tool off. In this connection, servo amplifier 90 can apply negative torque to brake the motor 16.

In the foregoing basic operation as described, the tool stops, but not quickly enough to prevent some torque overshoot above the torque set on the controller. The time required to sense the torque, process the information and remove the run signal, along with the inertia in the decelerating high-speed elements in the tool, cause the rotating tool components to continue to rotate beyond the point at which they were to have stopped. This excess rotation, when transmitted through the tool to the fastener, can potentially drive the final fastener torque well beyond the target torque set in the controller.

In accordance with the present invention, there is provided a new and improved control system and method to correct for torque overshoot in such electric power tools. Controller 104 has an automatic downshift feature which senses torque rate on each rundown and automatically adjusts the speed of motor 16 to maintain accuracy on hard joints while maintaining speed on soft joints. This reduces fastening cycle time and minimizes tool heating automatically. To accomplish the foregoing, controller 104 takes an angle snapshot between two torque points during the linear portion of each rundown. The angle counted is compared to preset angles and controller 104 determines if the joint is hard, medium or soft. If the joint is hard or medium, controller 104 downshifts tool 10 to one of two new lower final rundown speeds. If the joint is considered soft, controller 104 maintains maximum speed. This allows tool 10 to run at maximum speed as long as possible before slowing down near the target torque.

Referring now to FIG. 3, curve 130 is a typical torque vs. angle of mm plot for operation of tool 10 while setting a threaded fastener. In accordance with the present invention, two torque points are defined, a first torque point 132 and a second torque point 134, which are percentages of the target torque 136, for example 25% and 50%, respectively. Two angle values are defined corresponding to the number of degrees measured along the portion of curve 130 between first torque point 132 and second torque point 134 on typical linear hard and medium joints. In particular, an automatic downshift hard angle parameter sets the maximum hard joint angle value, in degrees, for the automatic downshift software in controller 104, and an automatic downshift medium angle parameter sets maximum medium joint angle value, in degrees, for the automatic downshift software. Two final tightening speeds for tool 10 are defined as percentages of full speed corresponding to the tool system requirements for accurate shutoff on the two types of joints, hard and medium. In particular, an automatic downshift hard speed percent parameter sets the tool speed desired after the automatic downshift software determines that the joint is hard, and an automatic downshift medium speed percent parameter sets the tool speed desired after the automatic downshift software determines the joint is medium.

In accordance with the present invention, when the torque as measured by transducer 26 reaches the level of automatic downshift torque point 132, i.e. the first torque point, controller 104 begins counting degrees of tool spindle rotation, i.e. angle, as measured by resolver 24. When the torque reaches the level of automatic downshift torque point 134, i.e. the second torque point, controller 104 compares the angle counted with the values of the automatic downshift hard and medium angles to determine the joint type, i.e. hard, medium or soft. The joint is considered soft unless the angle counted is below the automatic downshift medium angle. The joint is then considered medium unless the angle counted is also below the automatic downshift hard angle. The joint is then considered hard.

As soon as controller 104 determines that the joint is hard or medium, it immediately causes the speed of tool 10 to change to the percentage of maximum tool speed defined by the automatic downshift hard or medium percent parameters. For soft joints the tool speed is not changed.

Figure 4A:
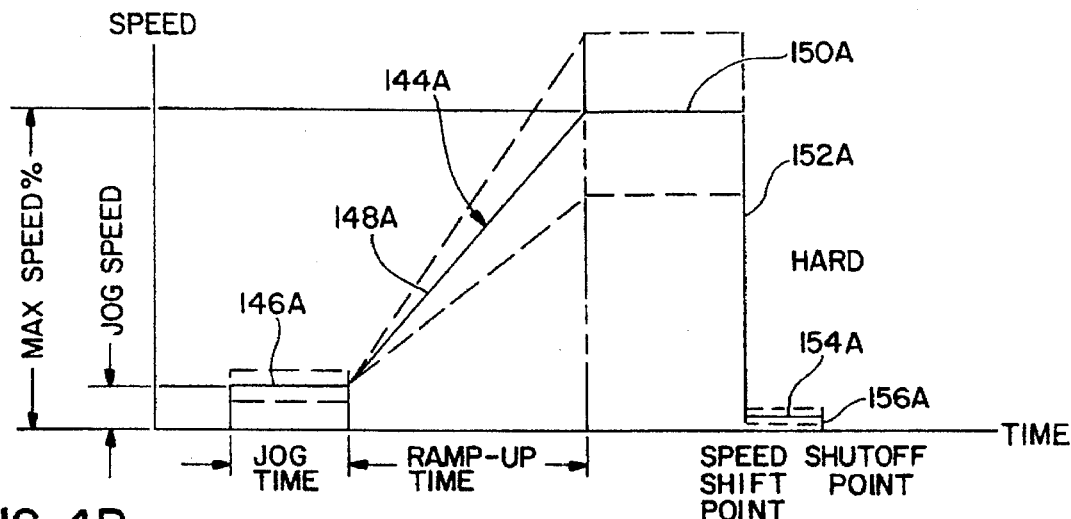
FIGS. 4A, 4B and 4C are graphs including speed-time plots further illustrating the present invention.
Figure 4B:
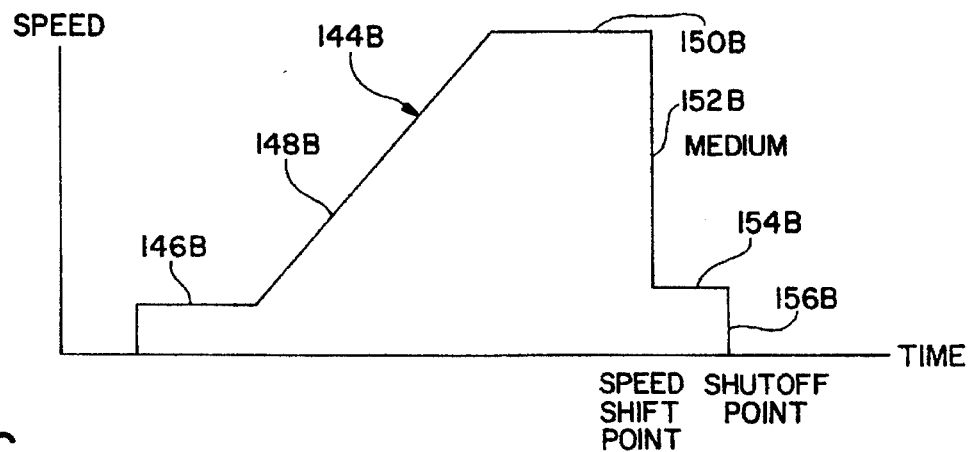
Figure 4C:
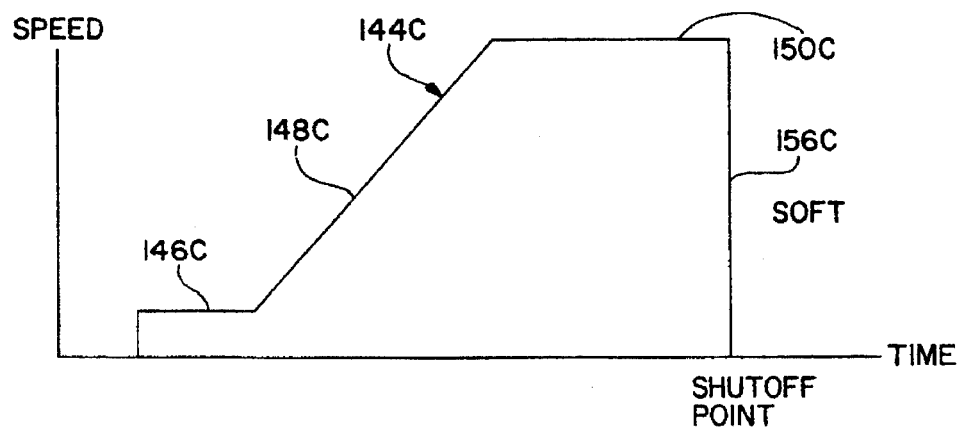

The foregoing is illustrated further in FIGS. 4A, 4B and 4C which are graphs including speed/time curves which show effects on various parameters with the three different joint rates, i.e. hard, medium and soft. In particular, curves 144A, 144B and 144C are speed/time curves for hard, medium and soft joints, respectively. Portions 146A 146B and 146C represent jog speed of tool 10, portions of 148A, 148B and 148C represent tool ramp-up speed and portions 150A, 150B and 150C represent a percent of maximum tool speed. The automatic downshift feature of the present invention is illustrated by the speed shift points 152A and 152B for the hard and medium joints and by the lack of speed shift point for the soft joint. Referring first to curve 144A, when controller 104 determines that the joint is hard, the speed of tool 10 is shifted at point 152A from the level 150A down to the level 154A for hard joints. The tool speed remains at this low level until the tool shutoff point 156A is reached. On the other hand, when controller 104 determines that the joint is medium, the speed of tool 10 is shifted at point 152B from the level 150B down to the level 154B for medium joints. The tool speed remains at this low level until the tool shutoff point 156B is reached. It can be seen from FIGS. 4A and 4B that the downshift speed 154A is lower for hard joints than the downshifted speed 154B for medium joints. Lastly, when controller 104 determines that the joint is soft, the speed of tool 10 remains at the upper level 150C until the tool shutoff point 156C is reached. Thus, by virtue of the present invention accurate tool shutoff is provided for all three types of joints and the problem of torque overshoot is avoided.

The system of the present invention is illustrated further by FIG. 5 which is a structure chart of the principal modules in the portion of a typical microprocessor 170 of controller 104 for carrying out the present invention. The instantaneous torque obtained from transducer 26 is applied as an input to each of the program modules 172 and 174 which determine the time at which the selected fractional values of target torque occur, for example 25% and 50%, respectively, in the present illustration. In this connection, another module 176 which contains the target torque set on the meter applies that target torque to another input of each of the modules 172 and 174. Thus when 25% of target torque is reached module 172 provides an output, and when 50% of target torque is reached module 174 provides an output. A counter module 180 counts the number of angle degrees obtained from the output of resolver 24 and under control of the outputs from modules 172 and 174. In particular, the signal output of resolver 24 comprises pulses containing information as to the number of degrees of tool spindle rotation. When 25% of target torque is reached, module 172 provides an output signal which causes counter module 180 to begin counting the number of degrees of tool spindle rotation received via the signal from resolver 24. When 50% of target torque is reached, module 174 provides an output signal which causes counter module 180 to stop counting and provide an output signal containing the number of angle degrees between the selected fractional values of target torque.

A first angle module 182 contains an angle quantity corresponding to that of a high or hard rate joint. A first comparator module 184 compares the angle output of counter module 180 with the angle quantity of module 182, and if angle quantity of module 180 is less than or equal to the angle quantity of module 182, module 184 provides an output indicating that the joint is of the high or hard rate type. The output of comparator module 184 is used by a first speed control module 186 which provides a signal to servo amplifier 90 to cause a downshift of the tool speed to the level for high or hard rate joints, i.e. the speed level designated 154A in FIG. 4A.

Similarly, a second angle module 192 contains an angle quantity corresponding to that of a medium rate joint. A second comparator module 194 compares the angle output of counter module 180 with the angle quantity of module 192, and if the angle quantity of module 180 is less than or equal to the angle quantity of module 192, module 194 provides an output indicating that the joint is of the medium rate type. The output of comparator module 194 is used by a second speed control module 196 which provides a signal to servo amplifier 90 to cause a downshift of the tool speed to the level for medium rate joints, i.e. the speed level designated 154B in FIG. 4B.

A third comparator module 198 compares the angle output of counter module 180 with the angle quantity of module 192, and if the angle quantity of module 180 is greater than the angle quantity of module 192, module 198 provides an output indicating that the joint is of the low rate or soft type. The output of module 198 is received by a module 200 which results in no change being made in the tool speed.

The lines 202, 204 and 206 leading from the outputs of comparator modules 184, 194 and 198, respectively, illustrate the capability of utilizing the indications of hard, medium and soft joints, respectively, for whatever additional purposes may be of interest.

By way of example, in an illustrative tool system according to the present invention, controller 104 is commercially available from Stanley Air Tools, Cleveland, Ohio under the designation Series T801 and incorporates an Intel 8088 microprocessor, servo amplifier 90 under the designation X5389, power supply 96 consisting of transformer R7706, ground fault circuit interrupter R7747, rectifier R7752 and filter board X5392. Motor 16 and resolver 24 are commercially available from Stanley Air Tools, Cleveland, Ohio under the designation N4194. Torque transducer 26 is commercially available from Stanley Air Tools, Cleveland, Ohio under the designation N4245.

It is therefore apparent that the present invention accomplishes its intended objects. There is provided a system and method to correct for torque overshoot in electric power tools which operates efficiently and effectively on high, medium and low torque rate fastening jobs. By sensing torque per angle rate on each rundown and automatically adjusting the tool speed to maintain torque accuracy on higher torque rate joints while maintaining speed on lower rate joints, the tool is allowed to run at maximum speed as long as possible before slowing down near the target torque. This, in turn, automatically minimizes tool heating and maximizes job rate. The foregoing is accomplished with a minimum of user involvement and complexity.

While an embodiment of the present invention has been described in detail, that is for the purpose of illustration, not limitation.

What is claimed is:

1. A method for correcting for torque overshoot in an electric power tool to perform a fastening job wherein the tool is to be shut off at a target torque, said method comprising:
   a) defining first and second torque points which are percentages of the target torque;
   b) defining first and second angle values corresponding to tool spindle rotation to be measured between the first and second points for high torque rate and medium torque rate fastening jobs, respectively;
   c) measuring the angle value between the first and second points during rundown of the tool while performing the fastening job;
   d) comparing the measured angle value with pre-defined angle values for high torque rate and medium torque rate fastening jobs; and
   e) utilizing the results of the comparison to perform the fastening job.

2. The method of claim 1, wherein said step of utilizing the results of the comparison comprises controlling the speed of the tool as the target torque is reached.

3. The method of claim 1, wherein said step of utilizing the results of the comparison comprises:
   a) downshifting the tool to a speed providing accurate shutoff in high torque rate jobs if the measured angle value is less than or equal to the pre-defined angle value for high torque rate fastening jobs;
   b) downshifting the tool to a speed providing accurate shutoff in medium torque rate jobs if the measured angle value is less than or equal to the pre-defined angle value for medium torque rate fastening jobs; and
   c) maintaining the tool speed when the measured angle value is greater than the pre-defined angle value for medium torque rate fastening jobs.

4. The method of claim 1, wherein said first and second torque points are 25 percent and 50 percent, respectively, of the target torque.

5. A method for correcting for torque overshoot in an electric power tool to perform a fastening job wherein the tool is to be shut off at a target torque, said method comprising:
   a) defining first and second torque points which are percentages of the target torque;
   b) defining first and second angle values corresponding to the tool spindle rotation measured between the first and second points for high torque rate and medium torque rate fastening jobs, respectively;
   c) defining first and second final tightening tool speeds as percentages of full speed corresponding to requirements for accurate tool shut off on high torque rate and medium torque rate fastening jobs, respectively;
   d) measuring the angle value between the first and second torque points during rundown of the tool while performing the fastening job;
   e) comparing the measured angle value with the first and second defined angle values;
   f) downshifting the tool to the first defined final tightening speed if the measured angle value is less then or equal to the first defined angle value;
   g) downshifting the tool to the second defined final tightening speed if the measured angle value is less than or equal to the second defined angle value; and
   h) maintaining the tool speed when the measured angle value is greater than the second defined angle value.

6. The method of claim 5, wherein said first and second torque points are 25 percent and 50 percent, respectively, of the target torque.

7. A system for correcting for torque overshoot in an electric power tool driven by an electric motor wherein the tool is to be shut off at a target torque, said motor having speed control means operatively associated therewith, said system comprising:
   a) resolver means for providing angle information relating to degrees of rotation of said tool;
   b) torque transducer means for providing torque information relating to the job being performed by said tool; and
   c) controller means connected to said resolver means and to said torque transducer means for utilizing said angle information and said torque information to control the speed of said tool, said controller means comprising means for measuring the angle value between first and second torque points along a torque/angle curve of the job being performed by said tool during rundown of said tool while the job is being performed, means for comparing the measured angle value with predefined angles for high torque rate and medium torque rate jobs and means for utilizing the results of the comparison in connection with controlling said tool during the job.

8. The system of claim 7 wherein said means for utilizing the results of the comparison comprises:
  a) means for downshifting said tool to a speed providing accurate shutoff in high torque rate jobs if the measured angle value is less than or equal to a pre-defined angle value for high torque rate jobs;
  b) means for changing said tool speed to a speed providing accurate shutoff in medium torque rate jobs if the measured angle value is less than or equal to a pre-defined angle value for medium torque rate jobs; and
  c) means for maintaining the tool speed when the measured angle value is greater than the pre-defined angle value for medium torque rate jobs.

9. A system for correcting for torque overshoot in an electric power tool driven by an electric motor wherein the tool is to be shut off at a target torque, said system comprising:

a) means for providing angle information relating to degrees of rotation of said tool;
  b) means for providing torque information relating to the job being performed by said tool; and
  c) control means connected to said means for providing angle information and to said means for providing torque information for utilizing said angle information and said torque information to control the speed of said tool during fastener rundown and prior to tool shutoff;

said control means including automatic downshift means comprising:

1) means for obtaining the angle information between two predetermined torque points on the torque/angle curve for the job being performed by said tool;
  2) means for comparing the obtained angle information to predetermined angle values for high torque rate and medium torque rate jobs; and
  3) means for downshifting said tool to one of two final rundown speeds depending upon the results of the angle comparison.

* * * * *